(No Model.)
A. J. PARKER & G. M. GUERRANT.
SPECTACLES.
No. 453,327. Patented June 2, 1891.
Fig. 1.
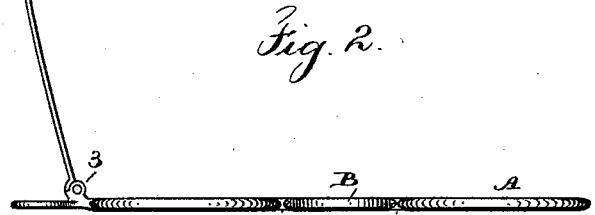
Fig. 2.
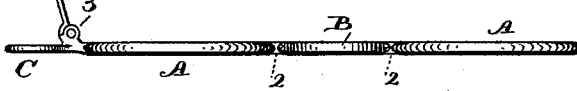
Fig. 3.
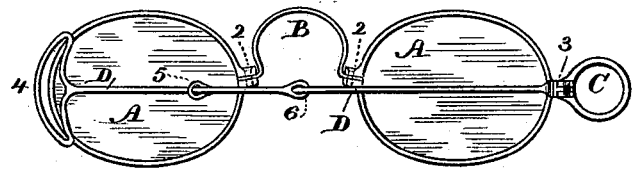
Witnesses
Chas H. Smith
J. Stail
Inventors
Alfred J. Parker.
Geo. M. Guerrant.
per Lemuel W. Serrell
Atty

UNITED STATES PATENT OFFICE.

ALFRED J. PARKER AND GEORGE M. GUERRANT, OF NEW YORK, N. Y.

SPECTACLES.

SPECIFICATION forming part of Letters Patent No. 453,327, dated June 2, 1891.

Application filed February 9, 1891. Serial No. 380,725. (No model.)

*To all whom it may concern:*

Be it known that we, ALFRED J. PARKER, a subject of the Queen of Great Britain, residing at the city and State of New York, and GEORGE M. GUERRANT, a citizen of the United States, residing at the city and State of New York, have invented an Improvement in Spectacles, of which the following is a specification.

Spectacles having two temple-bows are difficult to place in position without the use of both hands, and with business men, especially public speakers, this is inconvenient, because the left hand is often employed in holding a book or paper at a time when it becomes necessary to place the spectacles in position. With eyeglasses the spring employed at the nose-bow for causing the glasses to grasp the nose cannot always be relied upon for holding the glasses in position, and frequently the clip or holding device upon the nose is disagreeable and the skin becomes disfigured.

The present improvement is made to facilitate the placing of the spectacles in position by one hand and to insure greater stability of the spectacles under the ordinary circumstances of use.

In the drawings, Figure 1 is a perspective view illustrating the improved spectacles and their mode of use. Fig. 2 is a plan view; and Fig. 3 is a rear view with the temple-bow folded.

The glasses A are of any desired size or shape, provided with metal rims, and the nose-bow B is between the same and sufficiently rigid not to be bent or sprung under the ordinary conditions of use. It is preferable to unite the rims of the glasses and the nose-bow by the lugs and clamping-screws 2 at the junctions of the rims with the nose-bow, in order that the rim of the left glass may not have any projection except where it is united to the nose-bow; and at the outer edge of the rim at the right side of the eyeglasses is a hand-piece or loop C, that is adapted to being grasped by the thumb and finger in placing the glasses in position or removing them.

The temple-bow D is hinged at 3 to the spectacle-rim or hand-piece, and this temple-bow D is made with a cross-piece 4, preferably in the form of an open loop, and the side next the head is sufficiently concave to cause the ends of the cross-piece to bear against the side of the head, and the length of the temple-bow is to be such that the lower end of this cross-piece 4 passes behind the ear, and the parts are to be bent so as to adapt the spectacles to the person wearing them, and when applied in position the weight of the glasses rests principally by the bow B upon the nose, and the glasses cannot slide forward because the cross-piece 4 is hooked in behind the ear, and the spectacles are maintained in a horizontal position and in the line of vision by the cross-piece 4 resting against the side of the head. Hence such spectacles cannot tip or become misplaced easily, and it will be apparent that the spectacles can be put in position or removed by one hand, because by grasping the hand-piece C the spectacles can be placed upon the nose and the temple-bow moved into position for the cross-piece 4 to hook behind the ear, and the spectacles can be removed by the reverse operation, which is a great convenience over the spectacles having two temple-bows and requiring the use of both hands in putting them into position.

In order to adapt these spectacles to different persons they are sometimes made with an extension temple-bow—that is to say, the temple-bow is made of two pieces, with loops 5 and 6 at the respective ends, through which the adjacent piece of the temple-bow passes, as seen in Fig. 3—similar to the ordinary extension-bow, and these extension-pieces should slide with sufficient friction to prevent them becoming displaced under the ordinary circumstances of use.

We claim as our invention—

1. The combination, with the spectacles having a rigid nose-piece and a hand-piece at one end, of a single temple-bow hinged at such hand-piece and provided with a cross-piece adapted to pass behind the ear and to steady the spectacles in position, substantially as set forth.

2. The combination, with the spectacles having a rigid nose-piece, of a single temple-bow hinged at one end of the spectacles and having a cross-piece at the back end to set behind the ear and steady the glasses in position, substantially as set forth.

3. The combination, with the spectacles having a rigid nose-bow and a hand-piece at one end, of one temple-bow with two parts looped together so as to be extensible, a hinge to connect the bow and hand-piece, and a cross-piece to set behind the ear, substantially as set forth.

Signed by us this 6th day of February, 1891.

ALFRED J. PARKER.
GEO. M. GUERRANT.

Witnesses:
GEO. T. PINCKNEY,
CHAS. H. SMITH.